(12) United States Patent
Ridge

(10) Patent No.: US 7,545,639 B2
(45) Date of Patent: Jun. 9, 2009

(54) FIREPROOF CONTAINER WITH HEAT ACTIVATED CLOSURE PANEL

(76) Inventor: Edwin Ridge, 1404 Easton Rd., Roslyn, PA (US) 19001

(*) Notice: Subject to any disclaimer, the term of this patent is extended or adjusted under 35 U.S.C. 154(b) by 672 days.

(21) Appl. No.: 11/197,076

(22) Filed: Aug. 4, 2005

(65) Prior Publication Data

US 2007/0028527 A1 Feb. 8, 2007

(51) Int. Cl.
*H05K 7/16* (2006.01)
(52) U.S. Cl. .................. 361/690; 361/695; 174/50; 312/409; 428/34.4; 29/428; 109/75
(58) Field of Classification Search .......... 361/679, 361/683, 690, 692, 694, 695, 726; 726/34; 428/34.4–35.7, 920, 921; 52/1, 783, 13, 52/784.11; 252/601, 605–609; 312/214, 312/409; 244/188.5, 129.2; 340/542; 70/278.1; 174/50, 52.1; 307/125; 29/428; 109/184
See application file for complete search history.

(56) References Cited

U.S. PATENT DOCUMENTS

| | | | |
|---|---|---|---|
| 4,108,087 A * | 8/1978 | Sebesta | 109/51 |
| 4,574,454 A * | 3/1986 | Dyson | 29/434 |
| 4,685,402 A | 8/1987 | Nelson et al. | |
| 4,893,397 A * | 1/1990 | Hughes | 29/428 |
| 5,160,357 A | 11/1992 | Faber | |
| 5,321,963 A * | 6/1994 | Goldman | 70/278.1 |
| 5,479,341 A * | 12/1995 | Pihl et al. | 700/79 |
| 5,555,156 A | 9/1996 | Decante | |
| 5,623,597 A * | 4/1997 | Kikinis | 726/18 |
| 6,158,833 A * | 12/2000 | Engler | 312/409 |
| 6,435,455 B1 * | 8/2002 | Holman et al. | 244/118.5 |
| 6,686,003 B2 * | 2/2004 | Legare | 428/34.4 |
| 6,736,473 B2 * | 5/2004 | Cleveland et al. | 312/409 |
| 6,752,092 B2 * | 6/2004 | Beattie et al. | 109/75 |
| 7,204,472 B2 * | 4/2007 | Jones et al. | 251/129.06 |
| 7,245,491 B2 * | 7/2007 | Throckmorton et al. | 361/695 |
| 7,399,719 B2 * | 7/2008 | Hanan et al. | 442/136 |
| 2004/0012316 A1 * | 1/2004 | Davis | 312/409 |
| 2004/0256132 A1 * | 12/2004 | Schubert | 174/50 |
| 2006/0064709 A1 * | 3/2006 | Throckmorton et al. | 720/649 |
| 2006/0075509 A1 * | 4/2006 | Kishon | 726/34 |
| 2007/0061598 A1 * | 3/2007 | Bitton et al. | 713/194 |

* cited by examiner

*Primary Examiner*—Jayprakash N Gandhi
*Assistant Examiner*—Courtney Smith
(74) *Attorney, Agent, or Firm*—Michael Crilly, Esq.

(57) ABSTRACT

A fireproof container with heat activated panel is presented. The invention includes a fireproof container and panel, compression pins, and heat sensitive pin. Fireproof panel is disposed adjacent to vent holes located along the fireproof container and separated there from so as to allow airflow into the container. Compression pins are disposed between and attached to both container and panel so as to apply a mechanical load onto the panel directed towards the container. Heat sensitive pin is disposed between and attached to both container and panel so as to oppose the mechanical load applied by the compression pins when the temperature of the surrounding environment is below a threshold temperature. Heat sensitive pin yields to the mechanical load when the surrounding environment exceeds the threshold temperature, thereby enabling contact between panel and container so as to interrupt airflow into the enclosure.

20 Claims, 12 Drawing Sheets

FIREPROOF CONTAINER WITH HEAT ACTIVATED CLOSURE PANEL

CROSS REFERENCE TO RELATED APPLICATIONS

None.

FEDERALLY SPONSORED RESEARCH OR DEVELOPMENT

None.

BACKGROUND OF INVENTION

1. Field of the Invention

The present invention relates to a protective container for electronic devices. Specifically, the invention is a fireproof container, sufficiently voluminous for the storage of hard drives and the like, having a fireproof panel brought into contact with the container, so as to protect the devices therein, when the surrounding environment exceeds a pre-determined temperature.

2. Description of the Related Art

A variety of protective devices for computer equipment and the like are described and claimed in the related arts. Devices include both passive and active protection systems. Several examples are discussed below.

Engler, U.S. Pat. No. 6,158,833, describes and claims a thermally insulated cabinet for protecting electronic data storage devices from damage by accidental and environmental conditions and from intentional acts. The cabinet is comprised of multiple layers of thermal insulation materials.

Kikinis, U.S. Pat. No. 5,623,597, describes and claims a fireproof enclosure for the remote storage of a data storage element. The data storage element contacts a heat sink mounted to a wall of the enclosure so as to transfer heat out of the enclosure. Heat dissipation through the heat sink and into the wall is terminated by moving the heat sink or by stopping the flow of coolant therein when the temperature surrounding the enclosure indicates a fire.

Decante, U.S. Pat. No. 5,555,156, describes and claims a protective enclosure for a computer system. The enclosure includes a safe-like device having a door with a multi-polar switch to interrupt the exchange of data to protect the system against fraudulent use, damage, and tampering.

Generally, enclosures are either sealed thereby requiring heat to be conducted through the enclosure or manually sealable via a closable door. As such, heat management within the container remains a challenge. The related arts do not provide a means for closing a fireproof container based upon the response of a heat activated mechanical device.

What is required is a fireproof container for the storage of computer equipment having a heat activated closure panel which is open under normal temperature conditions and automatically closes when conditions representative of a fire are detected.

SUMMARY OF INVENTION

An object of the present invention is to provide a fireproof container having a heat sensitive mechanical device which allows airflow into the container to cool computer devices therein and seals the enclosure when temperature conditions are indicative of a fire.

The present invention includes a fireproof container, a fireproof panel, at least two compression pins and at least one heat sensitive pin. The fireproof container includes an enclosure and a lid with at least two vent holes. Fireproof panel is disposed adjacent to the vent holes and separated from the fireproof container so as to allow airflow between panel and container and through the vent holes. Compression pins are disposed between and contacting both fireproof container and panel so as to apply a mechanical load onto the panel directed towards the container. Heat sensitive pin is disposed between and contacting both fireproof container and panel so as to oppose the mechanical load applied by the compression pins when the temperature of the surrounding environment is below a defined temperature threshold. Heat sensitive pin yields to the mechanical load when the surrounding environment exceeds the threshold temperature thereby enabling contact between panel and container so as to interrupt airflow into the enclosure and shield the contents from fire and water.

In an alternate embodiment, a mechanical means is provided for manually enabling contact between fireproof panel and fireproof container to interrupt airflow into the enclosure.

The described invention provides advantages over the related arts. The invention is mechanically-based thereby avoiding electrically powered thermostats, valves, and the like for proper function. The invention relies on convection cooling of electronic devices within the fireproof container via airflow, thereby avoiding the inefficiencies of conduction cooling. The invention is readily adaptable to a wide variety of container designs.

REFERENCE NUMERALS

| | |
|---|---|
| 1 | Fireproof container system |
| 2 | Container |
| 3 | Panel |
| 4 | Electronic storage device |
| 5 | Power/data cable |
| 6 | Lid |
| 7 | Enclosure |
| 8 | Lock assembly |
| 9 | Handle |
| 10 | Hinge |
| 11a-11d | Compression pin assemblies |
| 12 | Heat sensitive pin assembly |
| 13 | Container wall |
| 14 | Fastener |
| 15 | Fastener |
| 16 | Top member |
| 17 | Side member |
| 18 | First plate |
| 19 | Second plate |
| 20 | Third plate |
| 21 | Spring |
| 22 | Nut |
| 23 | Fan |
| 24 | Vent hole |
| 25 | Fastener |
| 26 | Rod |
| 27 | Threaded cylinder |
| 28 | Opening |
| 29 | Heat sensitive material |
| 30 | Fastener |
| 31 | Storage volume |
| 32 | Ventilation space |
| 33 | Threaded rod |
| 34 | Hole |
| 35 | Seam |
| 36 | Bracket |
| 37 | Fastener |
| 38 | Hole |
| 39 | Bolt |
| 40 | Immovable structure |
| 41 | Grommet |
| 42 | Threaded hole |
| 43 | Threaded hole |
| 44 | Threaded hole |
| 45 | Guide pin hole |
| 46 | Knob |
| 47 | Threaded rod |
| 48 | Coupler |
| 49 | Hole |
| 50 | Cavity |
| 51 | Ring |
| 52 | Tube |
| 53 | T-shaped end |
| 54 | Vent hole |
| 55 | Threaded hole |
| 56 | Guide pin |

DETAILED DESCRIPTION OF INVENTION

Figure 1:
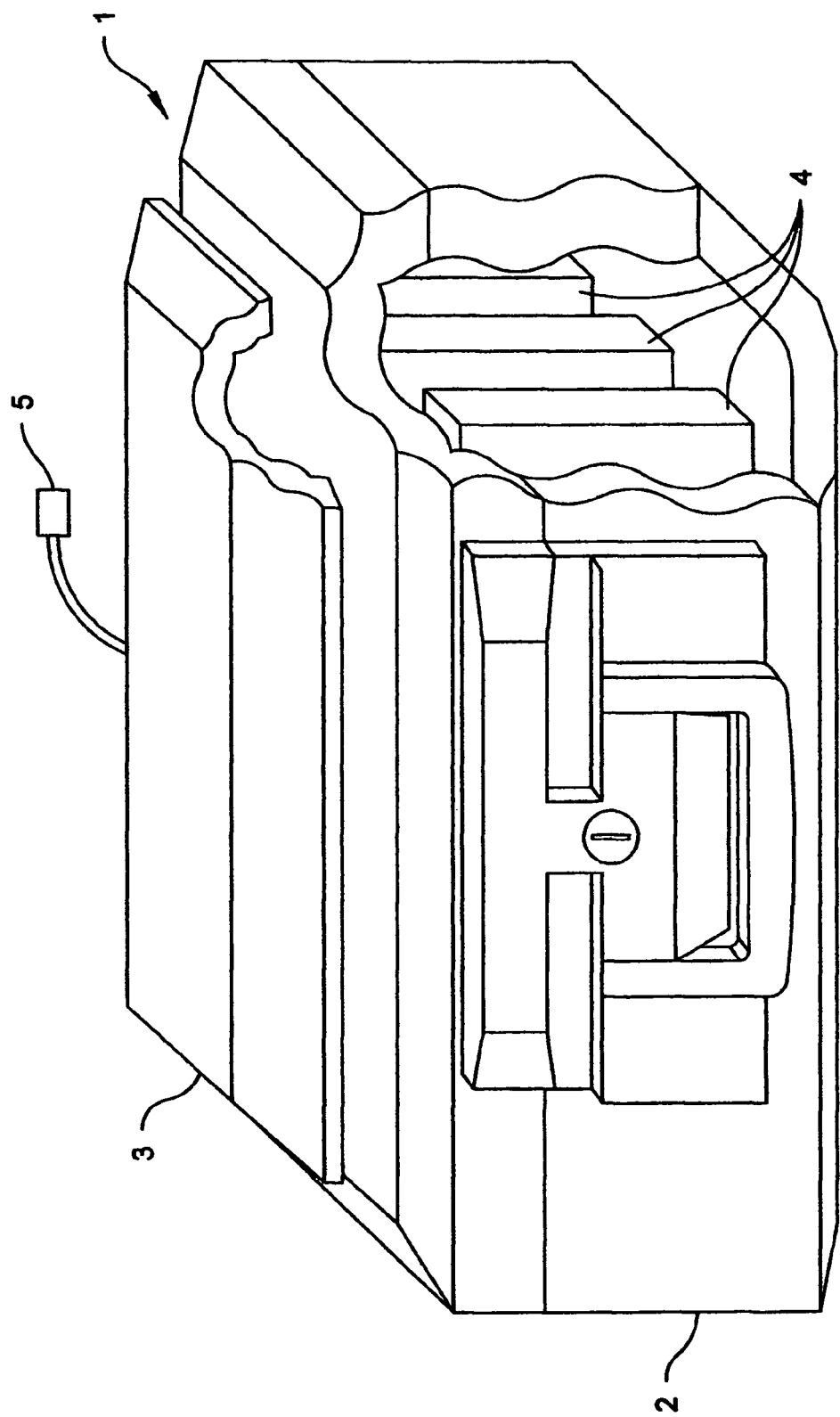
FIG. 1 is a perspective view of the present invention with partial section view showing container with several electronic storage devices therein and a panel attached to the lid portion of the container.

Referring now to FIG. 1, the present invention, generally referred to as a fireproof container system 1, includes a container 2 having a panel 3 movably attached thereto and an optional power/data cable 5.

The container 2 may be any commercially available fireproof storage box including, but not limited to, fire resistant containers, lockboxes, and safes. As represented in FIG. 1, the container 2 should have sufficient interior volume to completely enclose at least one electronic storage device 4. For example, a Fire-Safe Security Chest, model number 1100-SEN, manufactured by the Sentry Group with corporate offices in Rochester, N.Y., was sufficiently voluminous to accommodate up to three standard PC-type hard drives.

Figure 3:
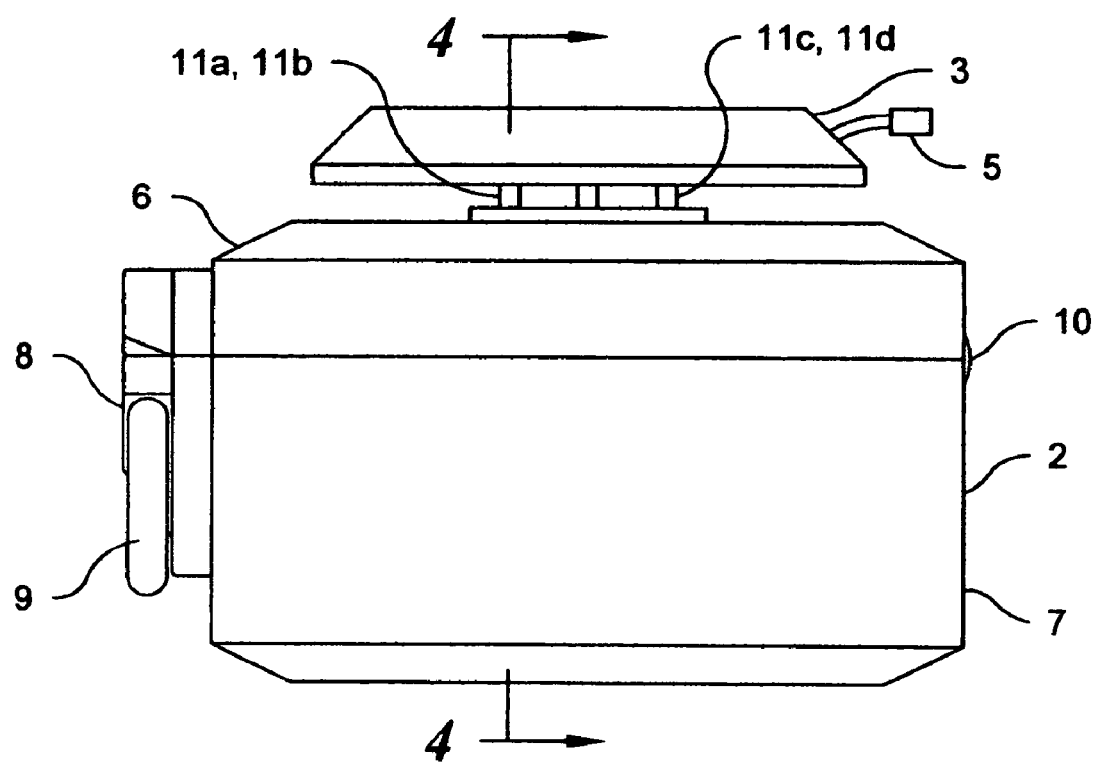
FIG. 3 is a side elevation view of the preferred embodiment in FIG. 2 showing the paired arrangement of compression pin assemblies about the heat sensitive pin.
Figure 4:
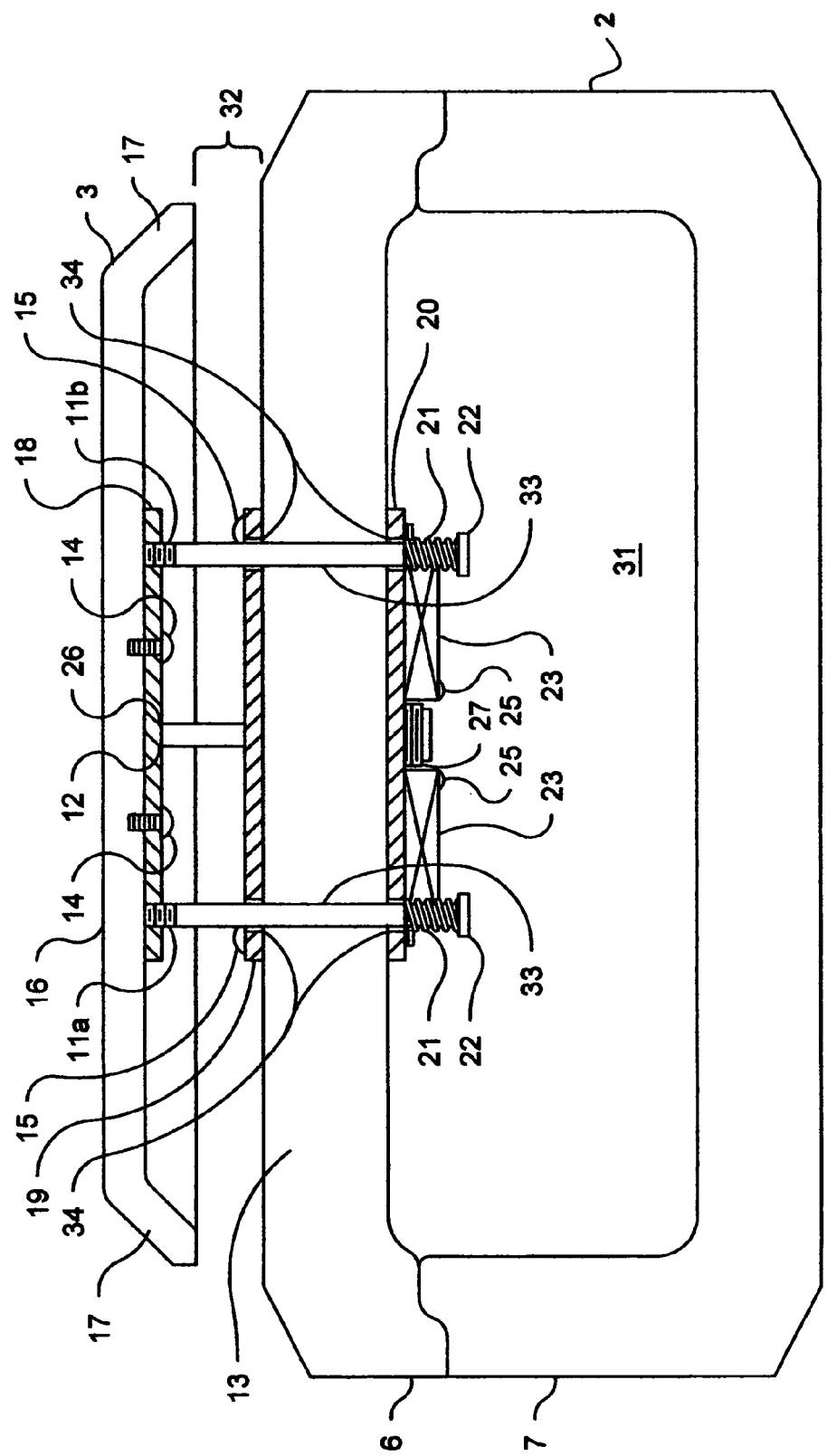
FIG. 4 is a sectional view of the present invention showing attachment of fans within the container and attachment of compression pin and heat sensitive pin assemblies to panel and container.

Referring now to FIG. 4, the panel 3 is likewise composed of one or more heat resistant materials known within the art. The panel 3 might be a cup-shaped structure composed of side members 17 seamlessly molded, formed, or otherwise attached in a substantially perpendicular fashion to a planar disposed top member 16. The dimensional extents of the panel 3 may be less than that of the container 2, as represented in FIGS. 1-3.

Figure 2:
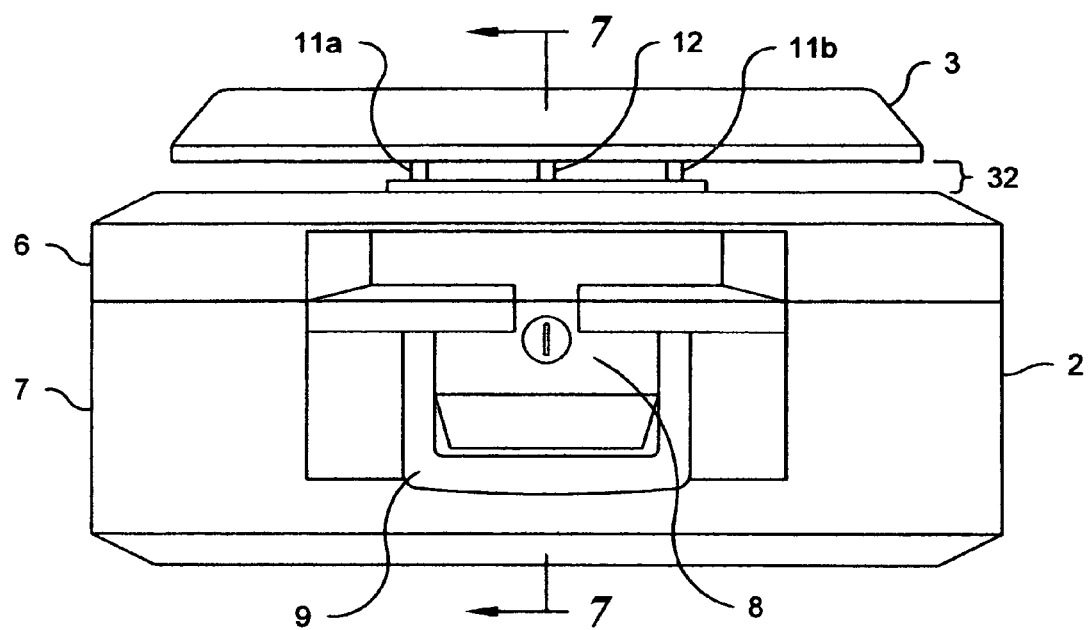
FIG. 2 is a front elevation view of a preferred embodiment of the present invention showing a ventilation space between panel and lid with compression pin assemblies and heat sensitive pin assembly disposed between and contacting panel and lid.

Referring now to FIGS. 2 and 3, preferred embodiments of the present invention include a container 2 having an upper lid 6 and a lower enclosure 7. Lid 6 and enclosure 7 are attached via a hinge 10 along one side so as to allow repeated entry into the container 2. Lid 6 and enclosure 7 may be secured via a lock assembly 8 along a second side to prevent unauthorized access. Furthermore, the container 2 may include an optional handle 9 along one side for transportation purposes.

Referring again to FIGS. 2 and 3, a panel 3 is disposed along one side of the container 2, preferably separate from and parallel to the lid 6 so as to provide a ventilation space 32. The ventilation space 32 should allow airflow between panel 3 and lid 6. Compression pin assemblies 11a-11d and heat sensitive pin assembly 12 are disposed between and attached to both lid 6 and panel 3 in a perpendicular fashion. In FIGS. 2 and 3, compression pin assemblies 11a-11c and 11b-11d are disposed in a paired arrangement about a centrally located heat sensitive pin assembly 12. In other embodiments, it is possible to have at least two compression pin assemblies 11a-11d and at least one heat sensitive pin assembly 12, thus providing a variety of design options.

Figure 5:
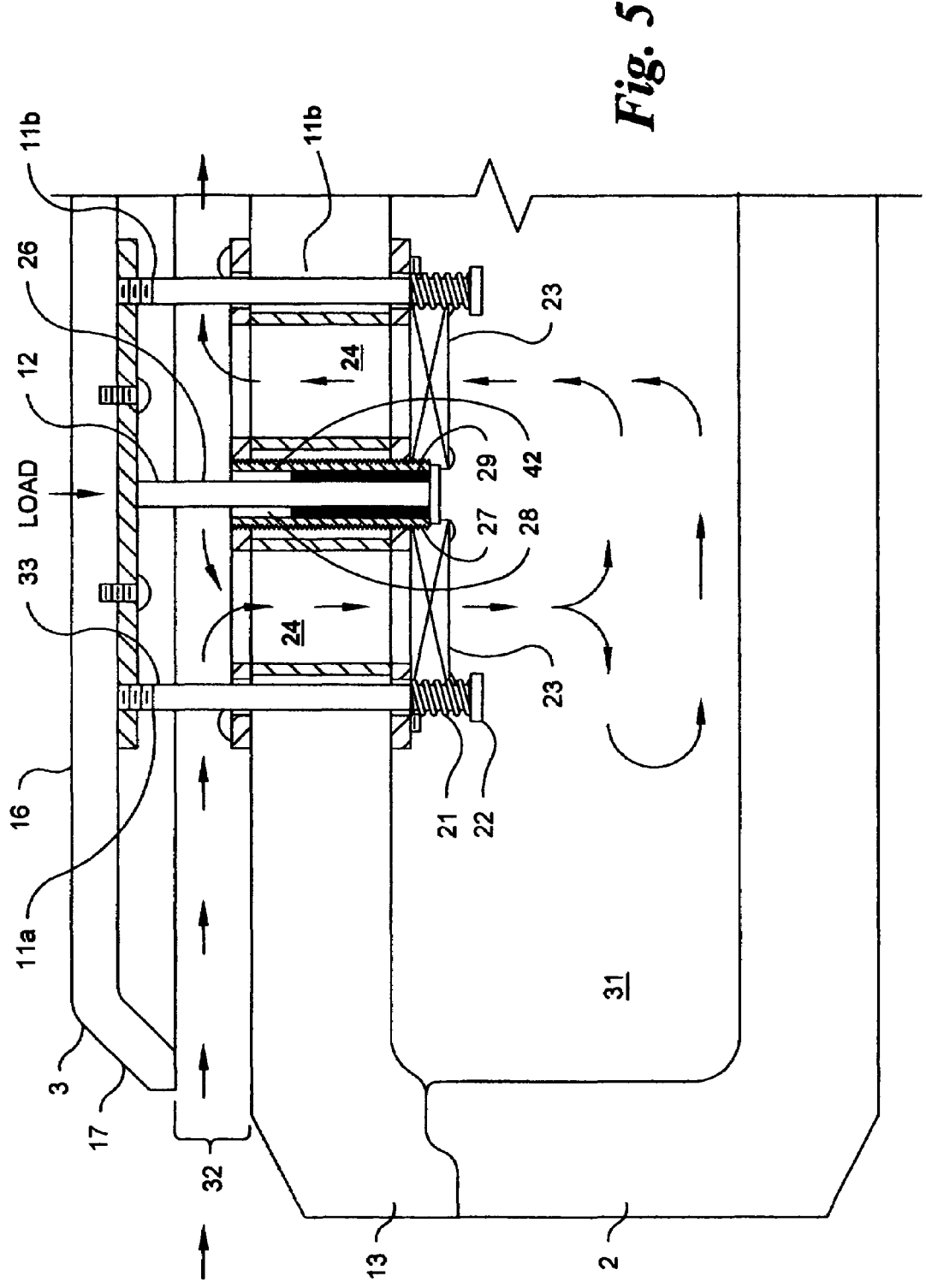
FIG. 5 is an enlarged broken section view of the present invention showing construction of compression pin and heat sensitive pin assemblies and an exemplary airflow pattern through the ventilation space, vent holes and storage volume when panel is in its OPEN position.
Figure 6:
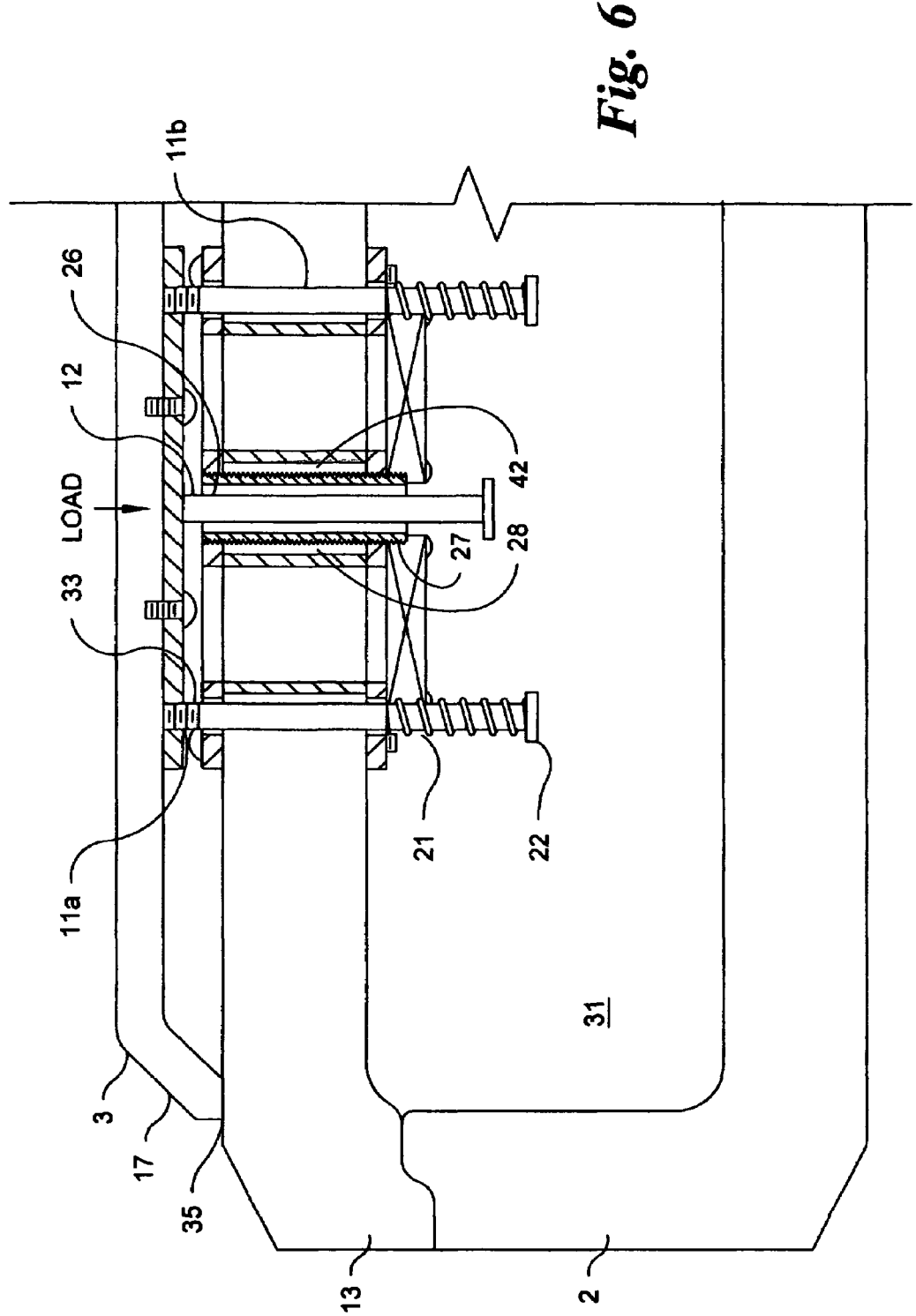
FIG. 6 is an enlarged broken section view of the present invention showing panel in its CLOSED position after thermal activation of the heat sensitive pin assembly and expansion of springs so as to move the panel into contact with the lid along the container.
Figure 9:
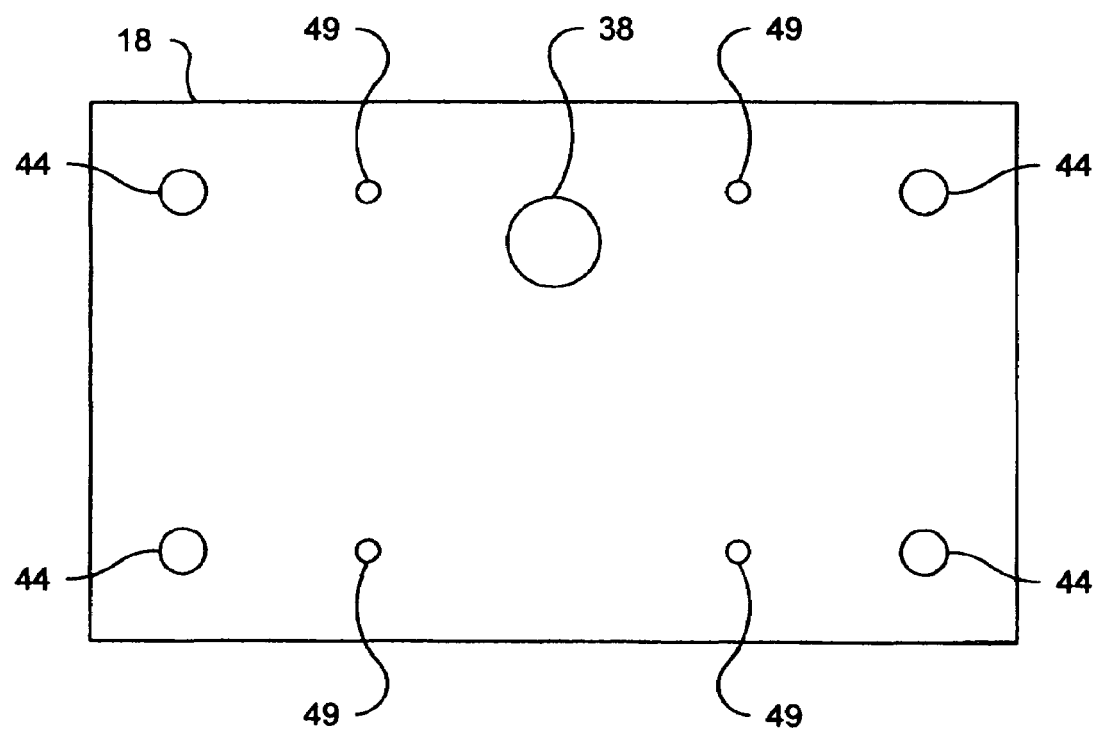
FIG. 9 is a top elevation view showing an exemplary hole pattern for the first plate.

Referring now to FIGS. 4-6, the lid 6 is shown contacting the enclosure 7 so as to orm a storage volume 31 within the fireproof container 2. Lid 6 includes at least two vent holes 24 disposed along and adjacent to the panel 3. A first plate 18 composed of a thin rigid element, preferably a thermally non-conductive material, is attached to the top member 16 of the panel 3 via fasteners 14, including screws, bolts, and rivets, through holes 49 along the first plate 18. Holes 49 are shown in FIG. 9.

Compression pin assemblies 11a-11d include a threaded rod 33 having a nut 22 and spring 21 at one end. The opposite end of each threaded rod 33 is screwed into a threaded hole 44 through the first plate 18 having a complementary thread arrangement so as to provide for a fixed and rigid attachment there between. Threaded holes 44 are shown in FIG. 9.

Figure 8:
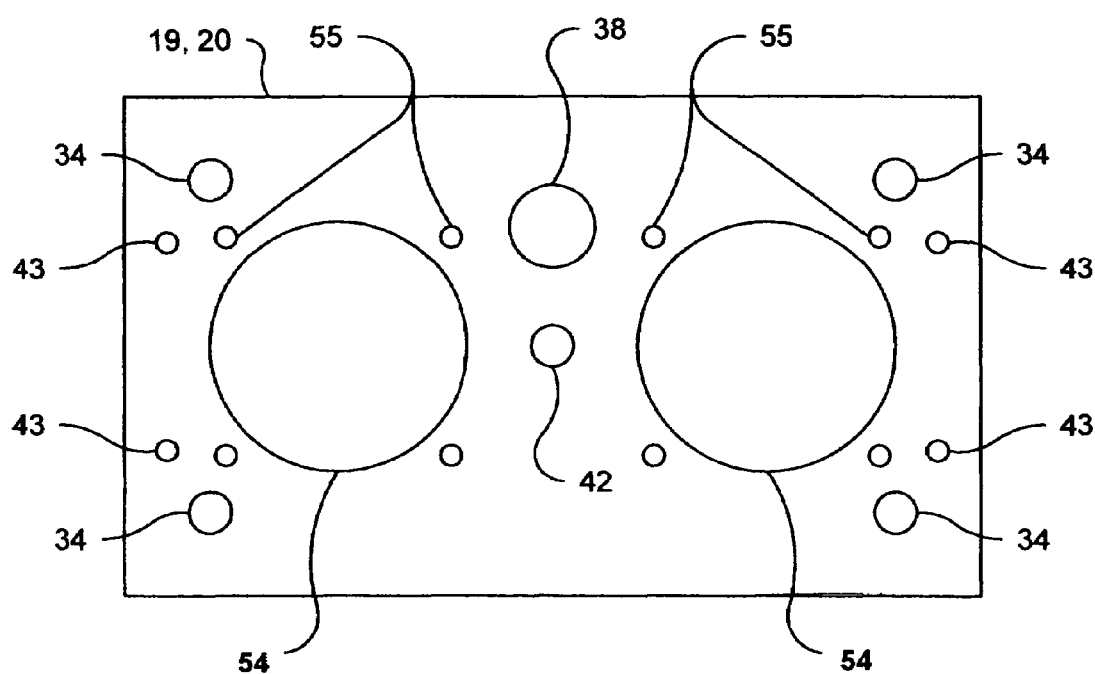
FIG. 8 is a top elevation view showing an exemplary hole pattern for second and third plates.

A second plate 19 and third plate 20, each composed of a thin rigid element, preferably a thermally non-conductive material, are fastened about the container wall 13 via fasteners 15 through threaded holes 43. Threaded holes 43 are shown in FIG. 8. Vent holes 54 through both second plate 19 and third plate 20, also shown in FIG. 8, are desired to be of similar shape, size, and location as the hole through the container wall 13 and in combination comprise the vent hole 24.

Threaded rods 33 pass through and are movable within holes 34, also shown in FIG. 8, along both second plate 19 and third plate 20. Holes 34 along second plate 19 and third plate 20 should be aligned with threaded holes 44 along first plate 18. A nut 22 is threaded onto each threaded rod 33 so as to partially compress the spring 21 against the third plate 20. A ventilation space 32 should exist between side members 17 of the panel 3 and container wall 13 along the lid 6 after compression of the springs 21.

As discussed above, two or more vent holes 24 pass through the second plate 19, third plate 20, and container wall 13 so as to allow for airflow from the surrounding environment into the container 2. A fan 23 may be fastened to the third plate 20 via fasteners 25 screwed into threaded holes 55, see FIG. 8, adjacent to a vent hole 24. In some embodiments, it may be desired to provide a fan 23 across each vent hole 24 in a push-pull arrangement.

Referring again to FIGS. 4-6, the heat sensitive pin assembly 12 is composed of a t-shaped rod 26 slidably disposed within a threaded cylinder 27. The threaded cylinder 27 has an opening 28 to allow movement of the rod 26 through the threaded cylinder 27. A heat sensitive material 29 is disposed between the threaded cylinder 27 and rod 26. When solidified, the heat sensitive material 29 sufficiently bonds the rod 26 to the threaded cylinder 27 so as to resist movement of the rod 26 when a force is applied by the compression pin assemblies 11a-11d through the panel 3 and onto the heat sensitive pin assembly 12. When heated to its metal temperature, the heat sensitive material 29 liquefies thereby releasing the rod 26 and allowing it to slide through the threaded cylinder 27. While a variety of heat sensitive materials 29 are applicable to the present invention, it is preferred to use eutectic alloys having a melt temperature of approximately 150 degrees Fahrenheit.

The heat sensitive pin assembly 12 is attached to the lid 6 by screwing the threaded cylinder 27 into complimentary threads along a threaded hole 42 through the container wall 13, second plate 19, and third plate 20, also see FIG. 8. The rod 26 should be sufficiently long so as to contact the first plate 18 and move the panel 3 thereby further compressing the springs 21 along the compression pin assemblies 11a-11d. The resultant assembly between heat sensitive pin assembly 12, compression pin assemblies 11a-11d, and panel 3 provides the ventilation space 32 between side members 17 and lid 6. The resultant compressive load exerted by the compress pin assemblies 11a-11d is resisted by the heat sensitive pin assembly 12, so long as the bond formed by the heat sensitive material 29 between rod 26 and threaded cylinder 27 is maintained.

Components comprising the compression pin assemblies 11a-11d may be fabricated from a variety of thermally conductive and non-conductive materials, including metals and plastics. However, components comprising the heat sensitive pin assembly 12 are preferred to be thermally conductive, preferably metals, so as to efficiently communicate heat from the surrounding airflow into the heat sensitive material 29.

Referring again to FIG. 5, the fireproof container system 1 is shown having an exemplary complimentary arrangement of two fans 23 to draw air from the surrounding environment into the storage volume 31 within the container 2. Airflow circulates within the storage volume 31 so as to cool electronic storage devices 4 therein and is thereafter expelled from the container 2. Airflow into and out of the container 2 should be at a temperature lower than the melt point of the heat sensitive material 29 under normal operating conditions.

A fire event adjacent to the fireproof container system 1 will heat the surrounding environment and raise the temperature of air passing entering, traversing, and exiting the container 2. This fire heated air contacts and heats the heat sensitive pin assembly 12 to a temperature exceeding the melt point of the temperature sensitive material 29.

Referring again to FIG. 6, liquefaction of the heat sensitive material 29 allows movement of the rod 26 within the heat sensitive pin assembly 12 and expansion of the springs 21 within the compression pin assemblies 11a-11d. The net result is movement of the panel 3 into contact with the container 2 thereby effectively sealing the fireproof container system 1 from the surrounding environment. A water and heat resistant seam 35 is formed between the side members 17 and container wall 13. In some embodiments, it may be desired to include a gasket along side members 17 and/or container wall 13 at the seam 35 so as to further ensure a water and heat resistant seam 35. In yet other embodiments, it may be desirous to have a micro-switch to interrupt power to fans 23 and electronic storage devices 4.

Figure 7:
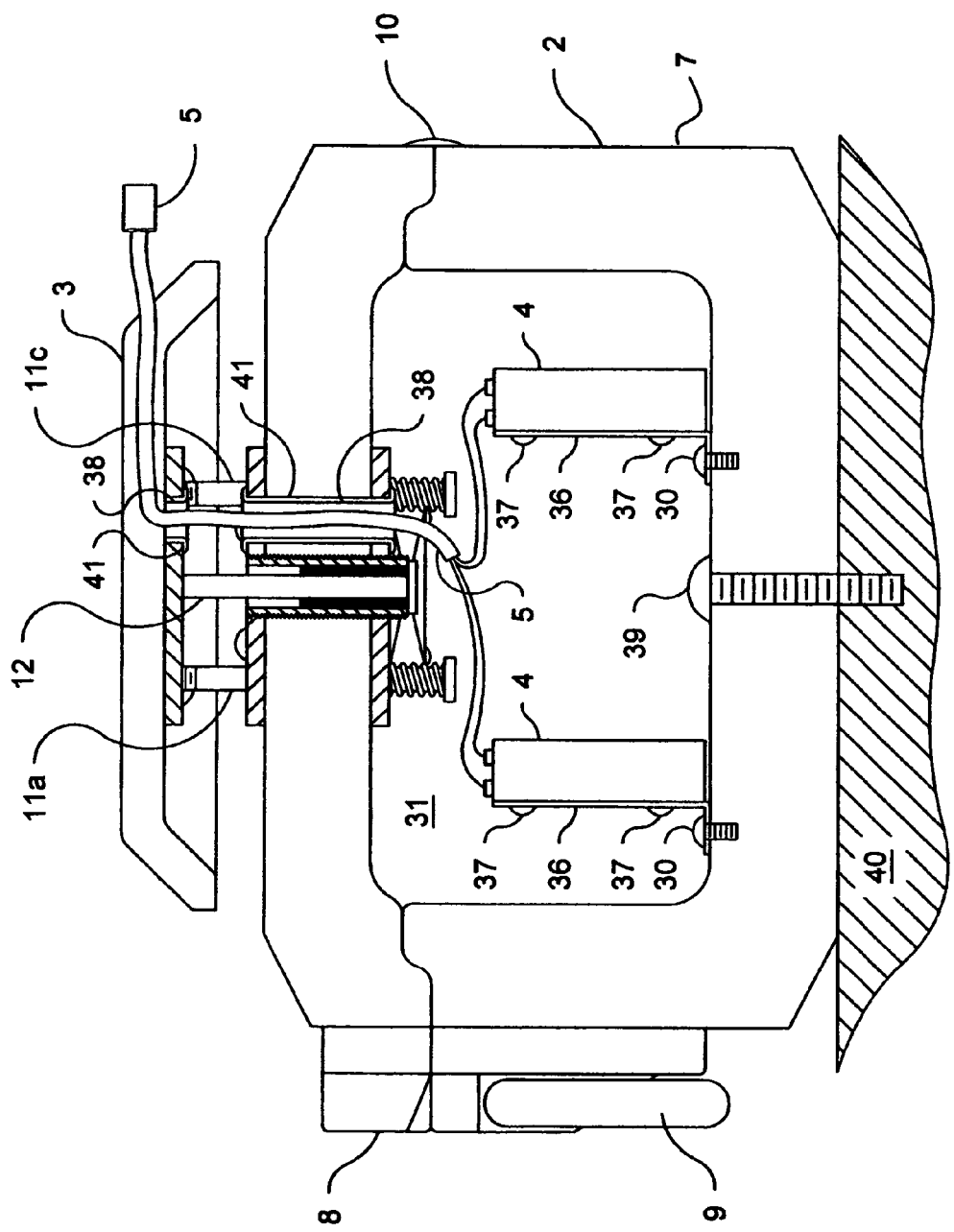
FIG. 7 is a an enlarged sectional view showing an embodiment wherein the power/data cable assembly is embedded within the panel and passes through a hole within the container, thereafter electrically connected to electronic storage devices each attached to a mounting bracket.

In other embodiments, it may be advantageous to mount electronic storage devices 4 directly to the interior of the enclosure 7 or onto brackets 36 composed of thermally conductive or non-conductive materials. Referring now to FIG. 7, the latter is shown whereby two brackets 36 are attached to the bottom of the enclosure 7 via fasteners 30. An electronic storage device 4 is likewise attached to each bracket 36 in a removable fashion via two or more fasteners 37.

In yet other embodiments, it might be advantageous to secure the fireproof container system 1 to a fixed and otherwise immovable floor or wall. Referring again to FIG. 7, an exemplary arrangement is shown wherein a bolt 39 passes through the enclosure 7 so as to mechanically secure the present invention to an immovable structure 40. The lock assembly 8 referenced above is advantageous to deny access into the container 2, thereby preventing removal of the bolt 39.

In yet other embodiments, it might be advantageous to secure one or more power/data cables 5 to the fireproof container system 1 so as to electrically power electronic storage devices 4, fans 23, and the like. Referring again to FIG. 7, a power/data cable 5, comprising one or more devices understood in the art, is shown embedded within and through the panel 3. While a variety of placements and attachment schemes are possible, it is preferred to prevent heat and water infiltration into the container 2 via the passageway for the power/data cable 5. As such, one or more materials comprising the panel 3 might be integrally molded or formed about the power/data cable 5 during fabricating of the panel 3. A hole 38 is mutually positioned along the first plate 18, second plate 19, and third plate 20, see FIGS. 8-9, and container wall 13 so as to allow passage of the power/data cable 5 from the panel 3 into the storage volume 31. Holes 38 should be sufficiently large so as to allow passage and sliding of the power/data cable 5 there through. In some embodiments, commercially available grommets 41 may be employed to line the holes 38 to avoid chaffing of the power/data cable 5 which might result with use and function of the fireproof container system 1.

Figure 10:
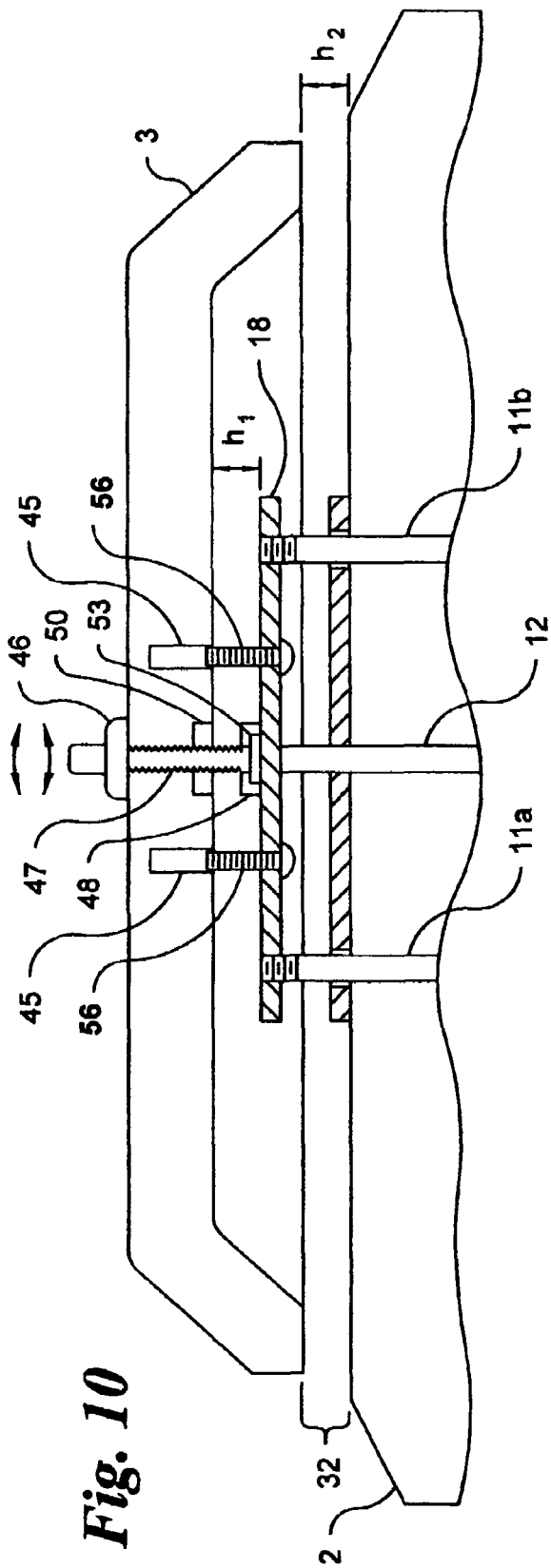
FIG. 10 is an enlarged sectional view showing an alternate embodiment having a knob and screw assembly and guide pins so as to facilitate the manual closure of the ventilation space between panel and container.
Figure 11:
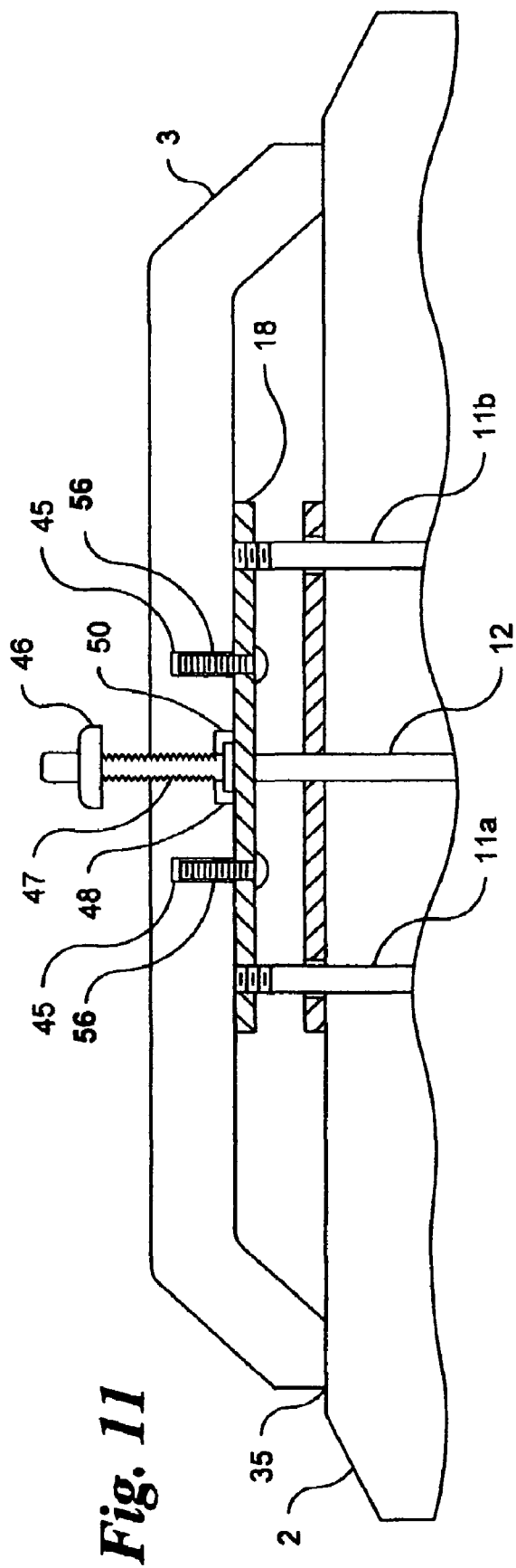
FIG. 11 is an enlarged sectional view of the alternate embodiment in FIG. 10 showing panel in its CLOSED position after rotation of knob and screw assembly.

Referring now to FIGS. 10 and 11, a mechanical means is provided for manually raising and lowering the panel 3 with respect to the container 2. Unlike the embodiment described above, the present arrangement includes physical separation between panel 3 and first plate 18. Two or more guide pins 56, examples including rivets, are attached to the first plate 18 so as to project towards the panel 3. Guide pin holes 45 are provided partially through the thickness of the panel 3. When panel 3 is raised, a guide pin 56 partially resides within each guide pin hole 45. When panel 3 is lowered, guide pins 56 substantially traverse and fill the guide pin holes 45. Guide pins 56 prevent rotation of the panel 3 with respect to the first plate 18 during manual operation of the panel 3.

A threaded rod 47 traverses the thickness of the panel 3 through a cavity having mutually contacting and complimentary threads. A knob 46 is fixed at one end of the threaded rod 47. A t-shaped end 53 is fixed at another end of the threaded rod 47 opposite of the knob 46. Knob 46, threaded rod 47, and t-shaped end 53 rotate as a single body when knob 46 is manually turned. The t-shaped end 53 is secured to the first plate 18 in a rotatable fashion via a coupler 48. The coupler 48 is either mechanically attached, welded, or adhesively bonded to the first plate 18 and includes a cavity therein which accommodates the t-shaped end 53 in a non-binding fashion. The assembly comprising knob 46, threaded rod 47, and t-shaped end 53 may be composed of thermally conductive and non-conductive materials.

Referring again to FIGS. 10 and 11, proper function of the mechanical closer requires the distance $h_1$ between first plate 18 and panel 3 to be at least as large as the distance $h_2$ between panel 3 and container 2. When the panel 3 is raised, a gap is provided between panel 3 and first plate 18 so as to provide a ventilation space 32. Rotation of the knob 46 causes a corresponding reduction of the gap between first plate 18 and panel 3 and a narrowing of the ventilation space 32 between panel 3 and container 2. During closure, the structure of the coupler 48 is accommodated by a cavity 50 of nearly approximate size and shape within the panel 3. Closure of the panel 3 onto the container 2 is achieved when panel 3 contacts the container 2, thereby forming the water and heat resistant seam 35 described above for heat activated functionality. The mechanical closure means described herein allows the panel 3 to be raised and lower independent of temperature and as conditions require.

Figure 12:
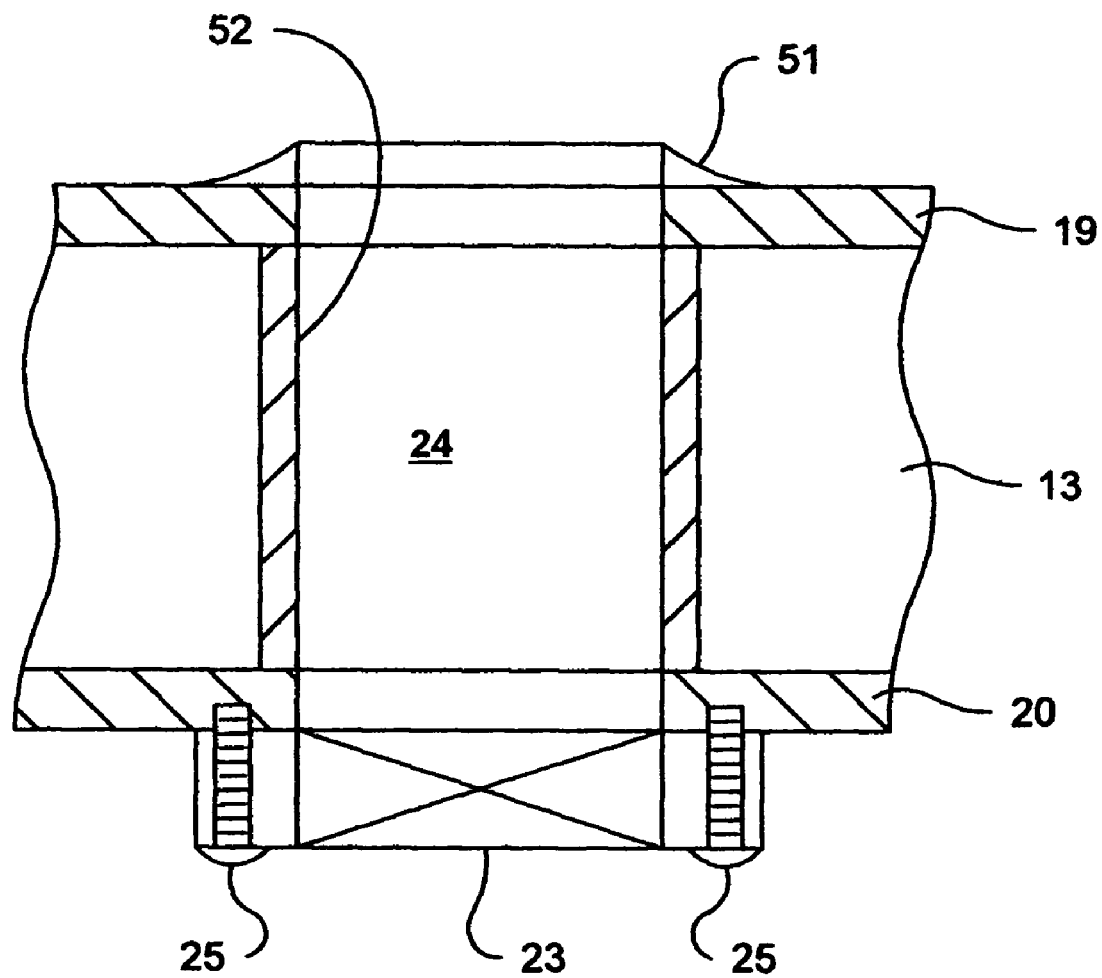
FIG. 12 is an enlarged sectional view of an alternate embodiment having a ring attached about the vent hole so as to prevent water from entering the container and a tube disposed within the vent hole to prevent contact with insulation materials.

Referring now to FIG. 12, a ring 51 may be mechanically attached or adhesively bonded to the second plate 19 opposite of the fan 23 and about each vent hole 24 so as to prevent water from contacting the fan 23. The ring 51 may be a disk or similarly shaped element. A variety of cross sectional shapes are possible, including uniformly thick, tapered, and contoured designs. FIG. 12 shows an exemplary tapered design.

In yet other embodiments, a tube 52 might be advantageous to line the vent hole 24 through the container wall 13, as shown in FIG. 12. Tube 52 may be comprised of a plastic element having an inner diameter of substantially equivalent dimension as the vent holes 54 along both second plate 19 and third plate 20. The tube 52 may be adhesively bonded to the container wall 13 and mechanically attached thereto via contact with second plate 19 and third plate 20, as represented in FIG. 12.

The description above indicates that a great degree of flexibility is offered in terms of the present invention. Although the present invention has been described in considerable detail with reference to certain preferred versions thereof, other versions are possible. Therefore, the spirit and scope of the appended claims should not be limited to the description of the preferred versions contained herein.

What is claimed is:

1. A thermally activated container system for at least one electronic storage devices comprising:
   (a) a fireproof container including an enclosure and a lid and having at least two vent holes there through;
   (b) a fireproof panel disposed along the exterior of said fireproof container adjacent to said holes and separated from said fireproof container so as to allow airflow there between;
   (c) at least two compression pins disposed between and attached at opposite ends to said fireproof container and said fireproof panel, each said compression pin includes a nut and a linear spring at one end of a threaded rod extending into said fireproof container, said linear spring applies a mechanical load onto said fireproof panel directed towards said fireproof container; and
   (d) at least one heat sensitive pin disposed between and attached to said fireproof container and said fireproof panel, each said heat sensitive pin includes a t-shaped rod slidably disposed within a threaded cylinder, said t-shaped rod movable along the length of said threaded cylinder, a temperature sensitive material fills the circumferential volume between said threaded cylinder and said t-shaped rod, said temperature sensitive material securing said t-shaped rod to said threaded cylinder below the melt temperature of said temperature sensitive material and allowing said t-shaped rod to move into said enclosure above the melt temperature of said temperature sensitive material, said fireproof panel contacts the exterior of said fireproof container so as to interrupt airflow into said enclosure after said temperature sensitive material has melted.

2. The thermally activated container system of claim 1, further comprising:
   (e) a power/data cable attached to and passing though said fireproof panel and into said fireproof container.

3. The thermally activated container system of claim 1, further comprising:
   (e) at least one bracket attached to and within said fireproof container for attachment of an electronic device.

4. The thermally activated container system of claim 1, further comprising:
   (e) at least one fan attached to said fireproof container to facilitate airflow through said enclosure.

5. The thermally activated container system of claim 1, wherein said temperature sensitive material is a eutectic alloy with a melt temperature of approximately 150 degrees Fahrenheit.

6. The thermally active container system of claim 1, further comprising:
   (e) a ring disposed about each said vent hole adjacent to said fireproof panel to prevent fluid from entering said fireproof container.

7. The thermally active container system of claim 1, further comprising:
   (e) a tube lining said vent holes and attached to said fireproof container.

8. The thermally activated container system of claim 1 further comprising:
   (e) at least one fastener passing through said fireproof container so as to secure said thermally activated container system to an immovable wall or an immovable floor, said at least one fastener secured within said fireproof container when said fireproof container is locked to prevent theft.

9. The thermally active container system of claim 8, further comprising:
   (f) a lock assembly to secure said lid to said enclosure; and
   (g) a handle attached to said fireproof container.

10. The thermally active container system of claim 1, further comprising:
    (e) at least one electronic device within said fireproof container.

11. A thermally activated container system for at least one electronic storage devices comprising:
- (a) a fireproof container including an enclosure and a lid and having at least two vent holes there through;
- (b) a fireproof panel disposed along the exterior of said fireproof container adjacent to said holes and separated from said fireproof container so as to allow airflow there between;
- (c) at least two compression pins disposed between and attached at opposite ends to said fireproof container and said fireproof panel, each said compression pin includes a nut and a linear spring at one end of a threaded rod extending into said fireproof container, said linear spring applies a mechanical load onto said fireproof panel directed towards said fireproof container;
- (d) at least one heat sensitive pin disposed between and attached to said fireproof container and said fireproof panel, each said heat sensitive pin includes a t-shaped rod slidably disposed within a threaded cylinder, said t-shaped rod movable along the length of said threaded cylinder, a temperature sensitive material fills the circumferential volume between said threaded cylinder and said t-shaped rod, said temperature sensitive material securing said t-shaped rod to said threaded cylinder below the melt temperature of said temperature sensitive material and allowing said t-shaped rod to move into said enclosure above the melt temperature of said temperature sensitive material, said fireproof panel contacts the exterior of said fireproof container so as to interrupt airflow into said enclosure after said temperature sensitive material has melted; and
- (e) a means for manually enabling contact between said fireproof panel and said fireproof container to interrupt airflow into said enclosure.

12. The thermally activated container system of claim 11, further comprising:
- (f) a power/data cable attached to and passing though said fireproof panel and into said fireproof container.

13. The thermally activated container system of claim 11, further comprising:
- (f) at least one bracket attached to and within said fireproof container for attachment of an electronic device.

14. The thermally activated container system of claim 11, further comprising:
- (f) at least one fan attached to said fireproof container to facilitate airflow through said enclosure.

15. The thermally activated container system of claim 11, wherein said temperature sensitive material is a eutectic alloy with a melt temperature of approximately 150 degrees Fahrenheit.

16. The thermally active container system of claim 11, further comprising:
- (f) a ring disposed about each said vent hole adjacent to said fireproof panel to prevent fluid from entering said fireproof container.

17. The thermally active container system of claim 11, further comprising:
- (f) a tube lining said vent holes and attached to said fireproof container.

18. The thermally activated container system of claim 11, further comprising:
- (f) at least one fastener passing through said fireproof container so as to secure said thermally activated container system to an immovable wall or an immovable floor, said at least one fastener secured within said fireproof container when said fireproof container is locked to prevent theft.

19. The thermally active container system of claim 18, further comprising:
- (g) a lock assembly to secure said lid to said enclosure; and
- (h) a handle attached to said fireproof container.

20. The thermally active container system of claim 11, further comprising:
- (f) at least one electronic device within said fireproof container.

* * * * *